(12) United States Patent
Theberge et al.

(10) Patent No.: US 7,729,044 B2
(45) Date of Patent: Jun. 1, 2010

(54) METHOD AND DEVICES FOR GENERATING STABLE AND TUNABLE LIGHT PULSES

(75) Inventors: Francis Theberge, Quebec (CA); See Leang Chin, Quebec (CA)

(73) Assignee: Universite Laval, Quebec (CA)

( * ) Notice: Subject to any disclaimer, the term of this patent is extended or adjusted under 35 U.S.C. 154(b) by 207 days.

(21) Appl. No.: 12/090,989

(22) PCT Filed: Oct. 20, 2006

(86) PCT No.: PCT/CA2006/001725

§ 371 (c)(1),
(2), (4) Date: Apr. 21, 2008

(87) PCT Pub. No.: WO2007/045097

PCT Pub. Date: Apr. 26, 2007

(65) Prior Publication Data

US 2008/0225383 A1    Sep. 18, 2008

Related U.S. Application Data

(60) Provisional application No. 60/728,331, filed on Oct. 20, 2005.

(51) Int. Cl.
*G02F 1/35* (2006.01)
*H01S 3/10* (2006.01)

(52) U.S. Cl. .................. 359/330; 359/326; 372/25; 372/28; 372/30

(58) Field of Classification Search ............... 359/326, 359/330; 372/3, 21, 25–28, 30, 108
See application file for complete search history.

(56) References Cited

U.S. PATENT DOCUMENTS 5,144,629 A    9/1992    Basu
5,371,752 A    12/1994   Powers et al.

(Continued)

FOREIGN PATENT DOCUMENTS

CA    2384325    3/2001

OTHER PUBLICATIONS

V. Petrov, F. Noack Mid-infrared femtosecond optical parametric amplification in potassium niobate Optics Letters, vol. 21, No. 19, 1576-1578 (1996).

(Continued)

*Primary Examiner*—Hemang Sanghavi
(74) *Attorney, Agent, or Firm*—Baker & Hostetler LLP

(57) ABSTRACT

Methods and devices for generating stable, tunable and intense output light pulses are provided. A primary beam of light pulses is used to form a filament in an interaction zone. A secondary bean of light pulses is superposed with the filament and interacts therewith to generate the output light pulses. The parameters of the primary and secondary beams in the interaction zone can be controlled to obtain targeted optical characteristics of the output pulses. Multiple secondary beams may also be used.

36 Claims, 10 Drawing Sheets

U.S. PATENT DOCUMENTS

| | | | |
|---|---|---|---|
| 5,499,134 | A | 3/1996 | Galvanauskas |
| 5,579,152 | A | 11/1996 | Ellingson et al. |
| 6,134,372 | A | 10/2000 | Ichikawa |
| 6,700,905 | B1 | 3/2004 | Karasawa |
| 6,710,914 | B2 | 3/2004 | Arbore et al. |
| 6,813,429 | B2 | 11/2004 | Price et al. |
| 6,870,663 | B2 | 3/2005 | Kato et al. |
| 2006/0153254 | A1* | 7/2006 | Franjic et al. ............ 372/30 |
| 2008/0170218 | A1* | 7/2008 | Dantus et al. ............ 356/39 |

OTHER PUBLICATIONS

E. Zeromskis, A. Du Bietis, G. Tamosauskas, A. Piskarskas Gain bandwidth broadening of the continuum-seeded optical parametric amplifier by use of two pump beams Optics Communications 203, 435-440 (2002).

A.E. Jailaubekov, S.E. Bradforth Tunable 30-femtosecond pulses across the deep ultraviolet Applied Physics Letters 87, 021107 (2005).

E.E. Serebryannikov, A.M. Zheltikov, N. Ishii, C.Y. Teisset, S. Köhler, T. Fuji, T. Metzger, F. Krausz, A. Baltuška Soliton self-frequency shift of 6-fs pulses in photonic-crystal fibers Applied Physics, B 81, 585-588 (2005).

H. Schroeder, S.L. Chin Visualization of the evolution of multiple filaments in methanol Optics Communications 234, 399-406 (2004).

K.D. Moll, A.L. Gaeta Role of dispersion in multiple-collapse dynamics Optics Letters, vol. 29, No. 9, 995-997 (2004).

C. G. Durfee III, S. Backus, M.M. Murnane, H.C. Kapteyn Ultrabroadband phase-matched optical parametric generation in the ultraviolet by use of guided waves Optics Letters, vol. 22, No. 20, 1565-1567.

A. Becker, N. Aközbek, K Vijayalakshmi, E. Oral, C.M. Bowden, S.L. Chin Intensity clamping and re-focusing of intense femtosecond laser pulses in nitrogen molecular gas Applied Physics, B 73, 287-290 (2001).

W. Liu, S. Petit, A. Becker, N. Aközbek, C.M. Bowden, S.L. Chin Intensity clamping of a femtosecond laser pulse in condensed matter Optics Communications 202, 189-197 (2002).

N. Aközbek, A. Becker, M. Scolora, S.L. Chin, C.M. Bowden Continuum generation of the third-harmonic pulse generated by an intense femtosecond IR laser pulse in air Applied Physics, B 77, 177-183 (2003).

N. Aközbek, A. Iwasaki, A. Becker, M. Scalora, S.L. Chin, C.M. Bowden Third-harmonic generation and self-channeling in air using high-power femtosecond laser pulses Physical Review Letters, vol. 89, No. 14, 143901 (2002).

N. Aközbek, C. M. Bowden, S. L. Chin: J. Mod Propagation dynamics of ultra-short high-power laser pulses in air: supercontinuum generation and transverse ring formation Journal of Modern Optics, vol. 49 No. 3/4, 475-486 (2002).

S.L. Chin, S.A. Hosseini, W. Liu, Q. Luo, F. Théberge, N. Aközbek, A. Becker, V.P. Kandidov, O.G. Kosareva, H. Schroeder The propagation of powerful femtosecond laser pulses in optical media: physics, applications, and new challenges Canadian Journal of Physics 83, 863-905 (2005).

V.P. Kandidov, O.G. Kosareva, I.S. Golubtsov, W. Liu, A. Becker, N. Akozbek, C.M. Bowden, S. L. Chin; Self-transformation of a powerful femtosecond laser pulse into a white-light laser pulse in bulk optical media (or superconinuum generation) Applied Physics, B 77, 149-165 (2003).

N. Aközbek, M. Scalora, C.M. Bowden, S.L. Chin White-light continuum generation and filamentation during the propagation of ultra-short laser pulses in air Optics Communications 191, 353-362 (2001).

W. Liu, S.L. Chin, O. Kosareva, I.S. Golubtsov, V.P. Kandidov Multiple refocusing of a femtosecond laser pulse in a dispersive liquid (methanol) Optics Communications 225, 193-209 (2003).

* cited by examiner

METHOD AND DEVICES FOR GENERATING STABLE AND TUNABLE LIGHT PULSES

FIELD OF THE INVENTION

The present invention relates to sources of optical pulses and methods of generating optical pulses, particularly tunable and stable ultrashort light pulses.

BACKGROUND OF THE INVENTION

Several approaches are known in the art to generate tunable few-cycle fight pulses.

A first such method involves the four-waves mixing during the propagation of ultrashort laser pulse inside a gas-filled hollow capillary. Referred can for example be made to Canadian patent application no. 2,384,325 (KARASAWA et al.) on this subject. As shown in FIG. 1 of KARASAWA, for gas-filled hollow capillary, the optimization of the phase-matching for a given wavelength is achieved by adjusting the gas pressure inside the capillary with a gas chamber. This phase-matched gas pressure is critical for the energy conversion efficiency of the generated pulse: a small shift of the gas pressure results in severe decrease of the conversion efficiency.

With reference to U.S. Pat. No. 6,813,429 (PRICE et al) and U.S. Pat. No. 6,870,663 (KATO et al), it is also known to generate tunable light pulses through the soliton-self-frequency shifting effect in a microstructured fiber. For this technique (see FIG. 1 of PRICE), the ultrashort optical pulse propagating in the microstructured fiber experiences temporal reshaping and frequency down-shifting due to non-instantaneous and nonlinear response of the fiber's glass. In this soliton self-frequency shift process, the wavelength of the generated pulse depends on the fiber length. Moreover, the energy conversion efficiency of the generated self-frequency soliton is low because of the low coupling efficiency of the pumps and the high propagation loss due to the small fiber's core.

The energy scales of the techniques mentioned above are limited to a few hundred of nanojoules per generated pulse. Gas-filled hollow capillary and micro-structured fiber have serious inherent limiting factors: Energy scalability is limited; beam pointing fluctuations of the incoming beam directly translate into unwanted energy and pulse parameter fluctuations of the outgoing pulses and the performance critically depends on the quality of the fiber and capillary.

It is also known in the art to use a selectively tunable optical parametric generator to generate tunable light pulses, as for example shown in U.S. Pat. No. 5,144,629 (BASU) and U.S. Pat. No. 5,371,752 (POWERS et al). For optical parametric generator, such as an optical parametric oscillator (OPO) or an optical parametric amplifier (OPA), turnability is limited to a down-frequency shift of the laser pump through second order optical parametric effect in a nonlinear crystal. The group velocity mismatch between the pump and the generated pulses is significant and the spectral bandwidth of the generated pulse limits the crystal thickness to less than 1 mm thick for the generation of sub-100 fs laser pulse (see V. Petrov, F. Noack: Opt. Lett. 21, 1576 (1996)). Using a thinner nonlinear crystal for the parametric amplification results in a lower conversion efficiency. The energy of the generated pulse can reach the order of microjoule per pulse, but at the cost of complex multi-pass optical parametric amplifier setup. This is for example the case in E. Zeromskis, A. Dubietis, G. Tamošauskas, A. Piskarskas: Opt. Comm. 203, 435 (2002). In the first stage, tunable pulses are parametrically amplified in a nonlinear crystal from a generated white-light continuum seed. The white-light continuum seed was produced by a small portion of the pump pulse that was focused in a thin glass plate to generate white-light continuum by self-phase modulation. In the second and third stages, a pump beam for each amplification stage was produced by means of a 50% beam splitter. The pump beams were directed to the nonlinear crystal and the generated pulse was amplified in the nonlinear crystal if the temporal and spatial superposition of the pump beams with the white-light continuum seed was achieved by using the delay matching lines. There is therefore a need for an improved versatile approach to generating light pulses having desired optical characteristics.

SUMMARY OF THE INVENTION

In accordance with a first aspect of the present invention, there is provided a method for generating output light pulses having targeted optical characteristics. These optical characteristics may include at least one of a central wavelength, a spectral profile, a spatial profile, a temporal shape, an energy and a stability of the output light pulses. The method includes the following steps of:

a) inputting a primary beam of light pulses in an interaction zone. The primary beam has a peak power above a self-focusing threshold in the interaction zone and thereby forms a filament therein;

b) superposing a secondary beam of light pulses on at least a portion of the filament. The secondary beam interacts with the primary beam to generate the output light pulses; and c) adjusting parameters of the primary and secondary beams to obtain the targeted optical characteristics of the output light pulses. These parameters include at least one of a polarization, a chirp, a spatial profile, a temporal shape, a central wavelength and an energy of each of the primary and secondary beams, a delay between the primary and secondary beams and an angle therebetween.

In accordance with another aspect of the present invention, there is also provided an optical device for generating output light pulses having targeted optical characteristics, these optical characteristics including at least one of a central wavelength, a spectral profile, a spatial profile, a temporal shape, an energy and a stability of the output light pulses.

The optical device first includes means for inputting a primary beam of light pulses in an interaction zone. The primary beam has a peak power above a self-focusing threshold in the interaction zone, thereby forming a filament therein.

Means for superposing a secondary beam of light pulses on at least a portion of the filament are also provided. The secondary beam interacts with the primary beam to generate the output light pulses.

The optical device further includes means for adjusting parameters of the primary and secondary beams to obtain the targeted optical characteristics of the output light pulses. These parameters include at least one of a polarization, a chirp, a spatial profile, a temporal shape, a central wavelength and an energy of each of the primary and secondary beams, a delay between the primary and secondary beams and an angle therebetween.

In accordance with yet another aspect of the present invention, there is also provided a light source generating output light pulses. The light source includes a primary pulsed laser source generating a primary beam of light pulses. A secondary pulsed laser source generating a secondary beam of light pulses is also provided. The light source further includes an optical guiding assembly guiding the primary and secondary beams to an interaction zone. The primary beam has a peak power above a self-focusing threshold in the interaction zone, thereby forming a filament therein. The secondary beam is superposed on at least a portion of the filament and interacts with the primary beam to generate the output light pulses.

The present invention provides an efficient and simple approach making use of the parametric processes taking place during the filamentation of an intense ultrashort laser pulse. In the preferred embodiments, the method and devices of the present invention can advantageously enables the generation of stable, powerful and/or tunable few-cycles laser pulse; a simple alignment method; the use of any transparent medium as the filamentation medium; a large tuning range and there are no limiting factors in the damage threshold during filamentation in gases.

Other features and advantages of the present invention will be better understood upon reading of preferred embodiments thereof with reference to the appended drawings.

DESCRIPTION OF PREFERRED EMBODIMENTS OF THE INVENTION

Figure 1:
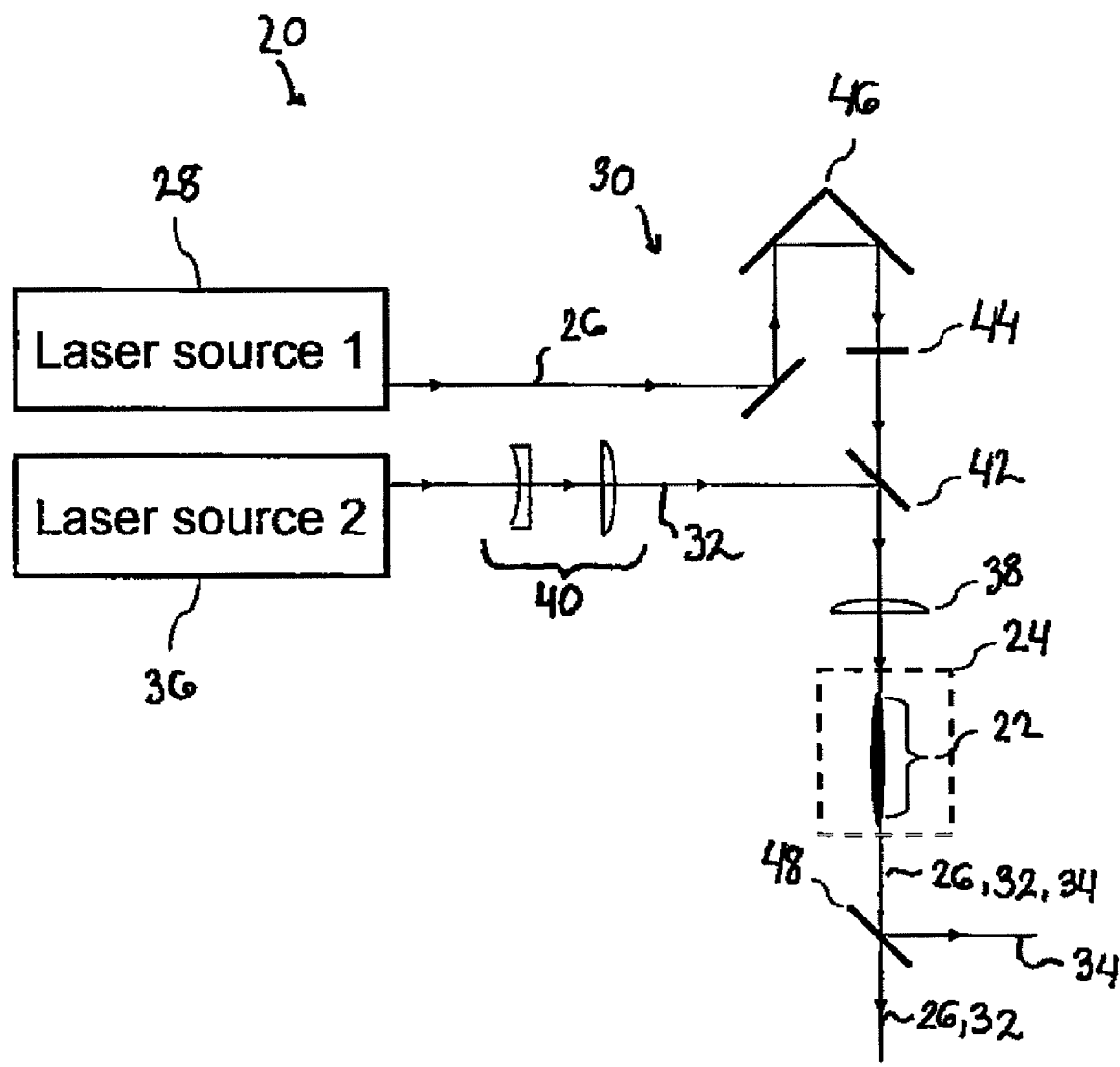
FIG. 1 is a schematic representation of a light source according to a preferred embodiment of the present invention.

In accordance with a preferred embodiment of the present inventions and with particular reference to FIG. 1 there is provided a method and a device 20 for generating output light pulses having targeted optical characteristics.

As will be understood from the description below, the present invention offers a versatile process allowing the possibility to control one or more of the optical characteristics of the output pulses, such as their central wavelength, spectral profile, spatial profile, temporal shape, energy or simply their stability.

The present invention makes use of the parametric processes taking place during the filamentation of an intense ultrashort laser pulse. As such, it first involves the formation of a filament 22 in an interaction zone 24 from a primary beam 26 of light pulses. The primary beam 26 is preferably generated by a primary pulsed laser source 28, which can be embodied by a fiber laser, a semiconductor laser, a dye laser, a gaseous laser, a solid-state laser, an amplification system, an optical parametric amplification system or a combination of some of these lasers and amplification systems. In the preferred embodiment, the light pulses of the first beam 26 have a central wavelength in the near Infrared (NIR), but it could preferably range anywhere from the ultraviolet to the far-infrared. The duration of the pulses of the primary beam 26 can preferably vary from a few hundred attoseconds to a few picoseconds, and is preferably in the femtosecond range.

The primary beam 26 generated by the primary pulsed laser source 28 is preferably guided to the interaction zone 24 by an optical guiding assembly 30, which may include any appropriate optical component. In the illustrated embodiment of FIG. 1, the optical guiding assembly includes focusing optics 38 disposed in the path of the primary beam 26 to focus it in the interaction zone 24.

The interaction zone 24 can be embodied by any optical medium where filamentation of the primary beam can take place and may be embodied by a solid, liquid or gaseous medium or a combination of one of these media. By way of example, the method of the present invention was successfully carried out with air, Argon and Krypton in the interaction zone 24. Alternative medium such as fused silica, lithium fluoride, water, methanol and β-barium borate crystal could also for example be used to generate output light pulses with the method of the present invention.

The primary beam 26 has a peak power in the interaction zone 24 above a self-focusing threshold, thereby forming a filament therein. It is known that the propagation of high peak power femtosecond laser pulses in an optical medium induces long filaments and refocusing along the propagation of the laser pulses. Particularly the filament formation from intense femtosecond Ti-sapphire laser pulses has been observed as far as 2 km in the atmosphere. The mechanism for femtosecond laser pulses propagating over long distances in optical media is the dynamic interplay between the Kerr self-focusing due to nonlinear intensity-dependent refractive index and defocusing from low-density plasma induced by multiphoton/tunnel ionization. Normally, it is the most powerful part of the pulse that self-focuses first during its propagation. The plasma generation balances the self-focusing effect and leads to a limited peak intensity along the laser pulse propagation. This is known as intensity clamping. The series of self-foci from different parts of the pulse gives rise to the perception of a filament. The peak intensity during filamentation is clamped but its intensity is sufficiently high to produce efficient parametric effects.

The method of the present invention includes superposing a secondary beam 32 of light pulses on the filament 22 or at least a portion thereof. Pulses of the second beam 32 will interact with the pulses of the primary beam 26 and during their propagation they will produce new output pulses 34 which can be deformed in space and time similar to the deformation of the pulses of the primary beam 26 through self-phase modulation, self-steepening and cross-phase modulation. The high efficiency is due to the long and large volume of the high but clamped intensity along the filament 22. The stabilization of the energy of the output pulses 34 is due to the clamping of the laser intensity inside the filament 22. As a consequence, even large fluctuations of the energies of the primary 26 result in constant laser intensity inside the filament 22 due to the dynamic equilibrium between the optical Kerr effect and the defocusing effect from the low-density plasma. Under suitable conditions, it can be possible to obtain intense and ultrashort output pulses 34 with high conversion efficiency by simply recompressing spectrally the newly generated output pulse 34 with dispersive optics, resulting in an intense tunable laser source 20 with pulse duration of few optical cycles.

Figure 2:
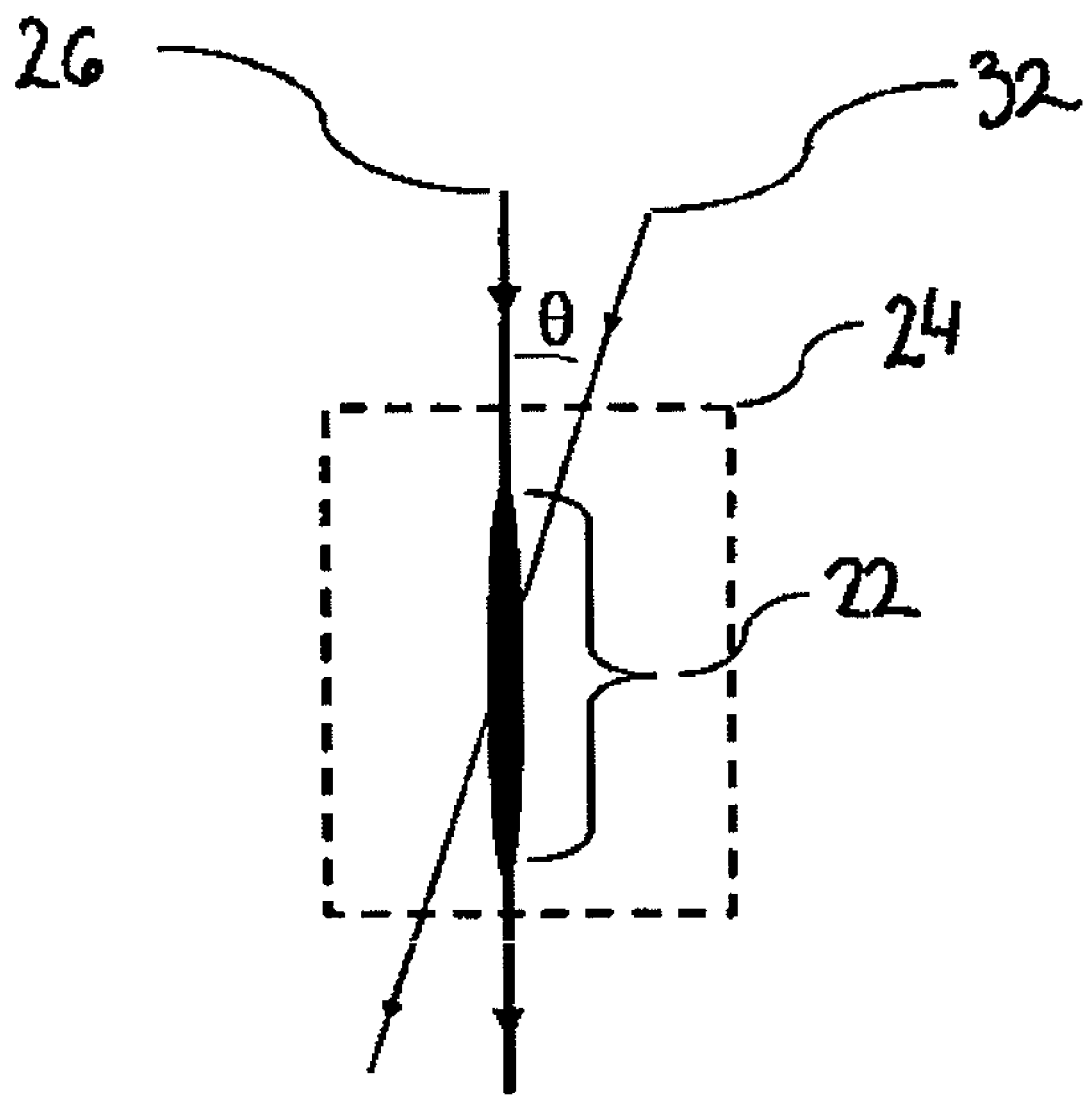
FIG. 2 is a schematic diagram of the superposition of the primary and secondary beam inside the interaction zone at an angle θ according to a preferred embodiment of the present invention.

The secondary beam 32 is preferably generated by a secondary pulsed light source 36 which can also be embodied by a fiber laser, a semiconductor laser, a dye laser, a gaseous laser, a solid-state laser, an amplification system, an optical parametric amplification system or a combination of one of these lasers and amplification systems. In an alternative embodiment, a single light source could be used to generate a source beam separated in two to form the primary and secondary beams. The spatial and the temporal profile of the primary and secondary beams 26 and 32 may be similar or dissimilar. As for the primary beam, the central wavelength of the pulses of the secondary beam 32 may span from the ultraviolet to the far-infrared, but their duration can extent over a larger range than those of the primary beam from a few hundred attoseconds to a few nanoseconds. In the preferred embodiment, the secondary beam 32 includes femtosecond pulses in the infrared (IR) range. The optical guiding assembly 30 preferably includes optical elements also guiding the secondary beam 32 to the interaction zone 24. In the embodiment of FIG. 1, a telescope 40 is provided in the path of the secondary beam 32 and a dichroic optical element 42 combines the primary and secondary beams 26 and 32 and direct them both to the focussing optics 38. The dichroic element 42 could alternatively be replaced by polarization discriminating optics or any other suitable optical component, as well known to one skilled in the art. As shown in FIG. 2, the secondary beam 32 makes an angle θ with the primary beam 26 in the interaction zone 24 which can vary from 0 degree to 180 degrees.

It will be noted that the secondary beam 32 may or may not also form a filament in the interaction zone 24. For the purposes of the present invention, it is sufficient that at least the primary beam 26 forms a filament, as this filamentation will temporarily change the properties of the optical medium in the interaction zone 24 and allow parametric effects to take place. However, it may be further advantageous to set the peak power of the secondary beam 32 above the self-focussing threshold so that it also forms a filament superposed with the filament 22 of the primary beam.

Targeted optical characteristics of the output pulses 34 can be obtained by adjusting different parameters of the primary and secondary beams 26 and 32. These parameters include the polarization, pulse temporal shape, spectral profile, spatial profile and the energy of each of the primary and secondary beams, the delay between them and the angle therebetween in the interaction zone.

The energy of the output pulses 34 may be controlled by controlling the energy of one or both of the primary and secondary beams, through energy controls of the primary or secondary pulsed laser sources 28 and 36 or through the choice and positioning of the components of the optical guiding assembly 30. The energy of the two beams will affect the conversion efficiency in the interaction zone and therefore the energy of the output pulses 34. The conversion efficiency will also be optimum if the polarization states of the primary and secondary beams 26 and 32 are adjusted relative to each other depending of the interaction zone 24. Preferably, polarization optics is provided in the path of one or both of the primary beam 26 and secondary beam 32. In the illustrated embodiment of FIG. 1, the polarization optics is embodied by a birefringent component 44 such as for example a half-wave plate, which is disposed in the path of the primary beam 26 in the illustrated embodiment. Alternatively, the polarization optics could be embodied by a thin plate polarizer or any other suitable component.

Preferably, at least one of the primary and secondary pulsed laser sources is spectrally tunable. In addition, an optical delay line 46 is preferably provided in the path of one or both of the primary and secondary beams 26 and 32. In the illustrated embodiment, such a delay line 46 is provided in the path of the primary beam 26. It will also be understood that the optical guiding assembly may include any appropriate element and have an appropriate configuration to adjust the parameters of the primary and secondary beams 26 and 32 as may be required for the desired targeted optical characteristics of the output pulses 34. For example, the light pulses of the primary and/or secondary beams 26 and 32 may be chirped, that is, the instantaneous frequency of the pulse may vary both with time and/or space, and the delay between chirped input pulses may be adjusted to modify the central wavelength and spectral distribution of the generated output pulses. Dispersive optics may also be used to modify the pulse duration and/or the temporal profile of both the input and the output pulses. Optics with the appropriate spectral response may also be used to modify the spectrum of both the input and the output pulses.

The central wavelength, spectral profile, spatial profile and temporal shape of the output pulses 34 are all dependent on a number of factors, such as the central wavelength, spectral shape, chirp, spatial profile and temporal shape of both the primary and secondary beams 26 and 32, as well as the delay and angle between them at the interaction zone 24. The length of the filament 22 and the change of optical medium in the interaction zone 24 will also have an impact. One skilled in the art will readily understand that by controlling the optical characteristics of the primary and secondary beams 26 and 32 and by controlling the conditions of their superposition, one opens up endless possibilities for the optical characteristics of the output pulses 34 created out of their interaction. As such, the output pulses 34 are fully tunable, making the optical device 20 of the invention extremely versatile.

The method of the present invention may also include a step of separating the output pulses 34 from the primary and secondary beams 26 and 32 downstream of the interaction zone 24. In the device illustrated in FIG. 1, output dichroic and/or polarization discriminating optics 48 is provided for this purpose.

Still referring to FIG. 1, a practical example of a light source embodying the device 20 of the present invention will be described in more details. It is understood that the characteristics of the device described below are given by way of example only and are in no way limitative to the scope of the present invention.

In this embodiment, the first beam 26 is a near-infrared (NIR) femtosecond laser pulse at 800 nm which is used to generate a filament 22 in air at ambient pressure. An infrared (IR) femtosecond laser pulse embodies the secondary beam 32 and is superposed with the generated filament 22 as shown in FIG. 2. The angle θ between the primary and secondary beams 26 and 32 is around 0 degree. The primary pulsed laser source 28 may for example be embodied by a Ti-sapphire chirped-pulse amplification (CPA) laser system, which generates femtosecond laser pulses with a central wavelength at 807 nm, a repetition rate of 1 kHz, an energy per pulse of 2 mJ and a transform limited pulse duration of 50 fs at full width at half maximum (FWHM). In this embodiment, the diameter of the elliptic beam mode at the $1/e^2$ level was $d_H$=8.0 mm and $d_V$=6.3 mm where $d_H$ and $d_V$ are horizontal and vertical diameters, respectively. The secondary pulsed laser source 36, also called the optical parametric amplifier (OPA) is preferably pumped by a NIR femtosecond laser beam. The OPA generated IR femtosecond laser pulse preferably has a central wavelength ranging from 900 nm to 1.6 µm. In the preferred embodiment, the pulse duration of the infrared pulse was 35fs (FWHM) and the energy per pulse was between 5 µJ to 70 µJ.

Figure 3:
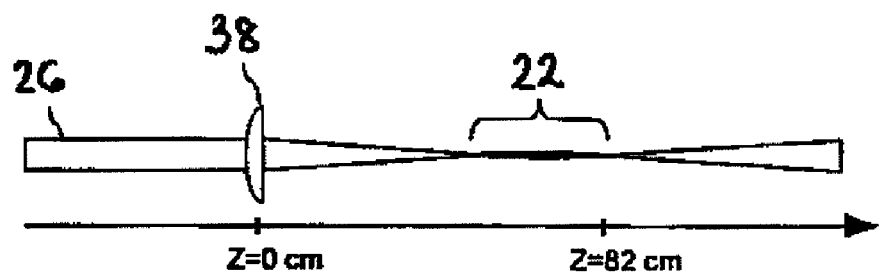
FIG. 3 is a schematic representation of the formation of a filament in the primary beam of light pulses.

Still in the preferred embodiment, the NIR laser pulses with energies ranging from 20 µJ to 1.0 mJ are focused into air at ambient pressure using an 82 cm focal length concave mirror 38 to generate a filament 22 a few centimeters long in air, as schematized in FIG. 3. The IR laser pulse is superposed in the interaction zone 24 by the use of the dichroic optical element 42 and the telescope 40. The temporal delay between the primary and secondary beams 26 and 32 is controlled by the optical delay line 46. The polarization of the primary beam 26 is controlled by the polarizing optics 44 and this polarization was optimized to get the maximum output energy for the generated output light pulse 34.

Figure 4:
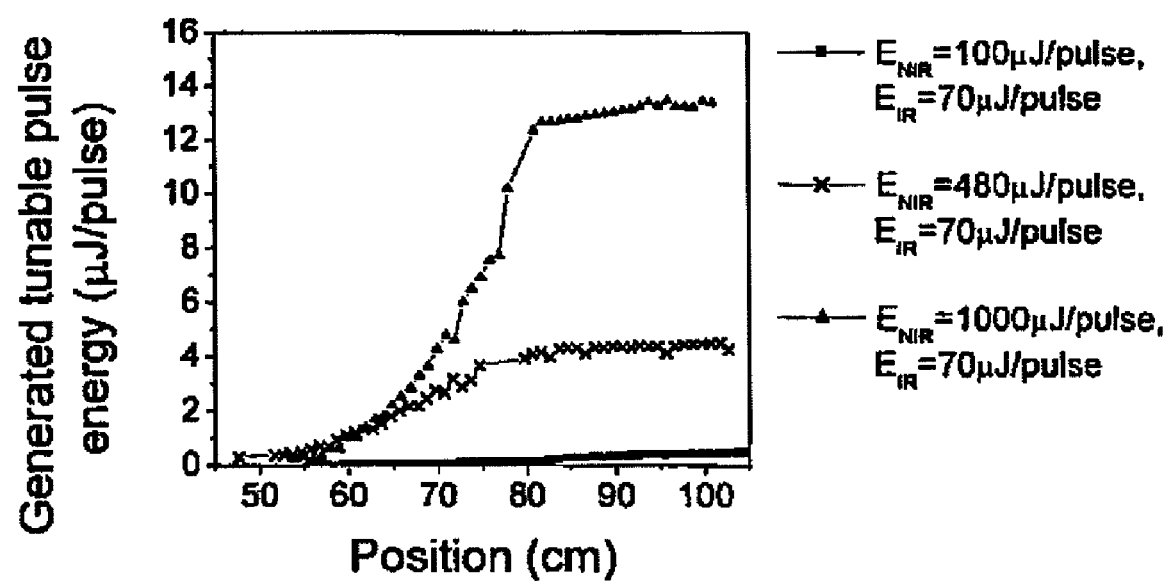
FIG. 4 is a graph showing the energy of the output light pulse inside the interaction zone for different energy values of the primary beam ($E_{NIR}$) and for a constant energy value of the pulses of the secondary beam ($E_{IR}$).

Due to the strong non-linear interaction between the IR and the NIR laser pulses during their co-propagation, efficient third-order parametric effects occurred. The tunable ultrashort light pulse was generated, for example, by the four-waves mixing process inside the filament 22. FIG. 4 shows the generation and the amplification of the tunable output pulse along the position in the interaction zone 24 for different NIR laser pulse energies. In the embodiment of FIG. 4 the focusing optics 38 was positioned at the propagation distance z=0 cm and its geometrical focus at z=82 cm.

Figure 5:
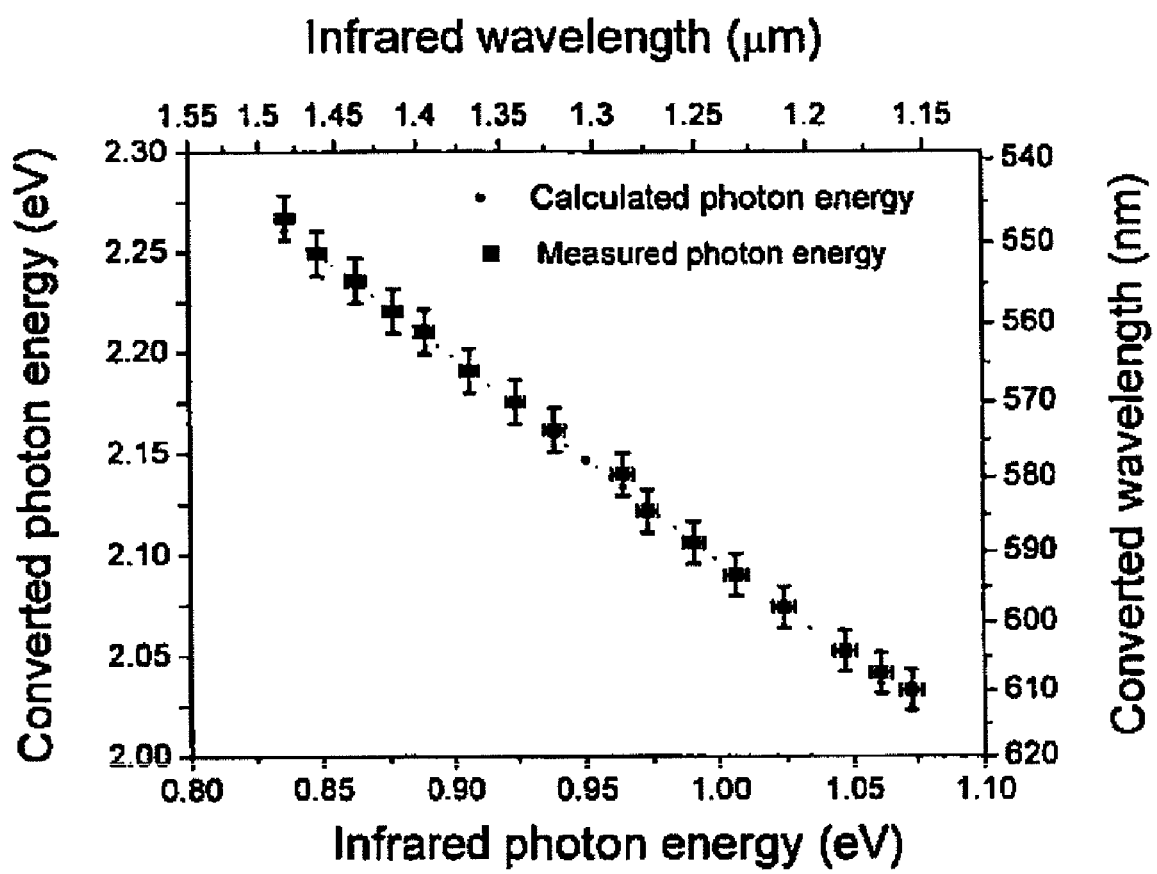
FIG. 5 is a graph showing the central wavelength of the output light pulses as a function of the central wavelength of the secondary beam.
Figure 6:
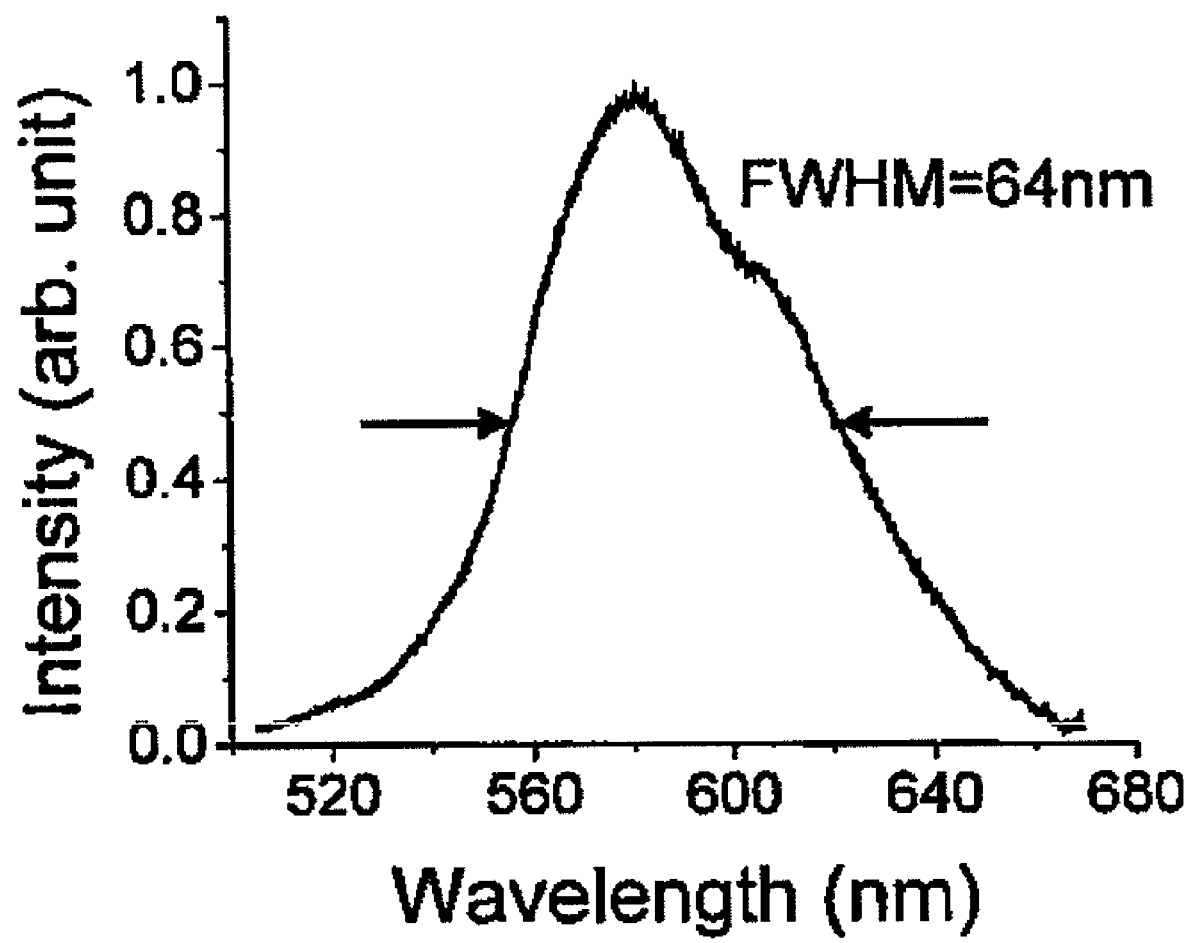
FIG. 6 shows a normalized spectrum of output light pulses generated using the light source of FIG. 1.
Figure 7:
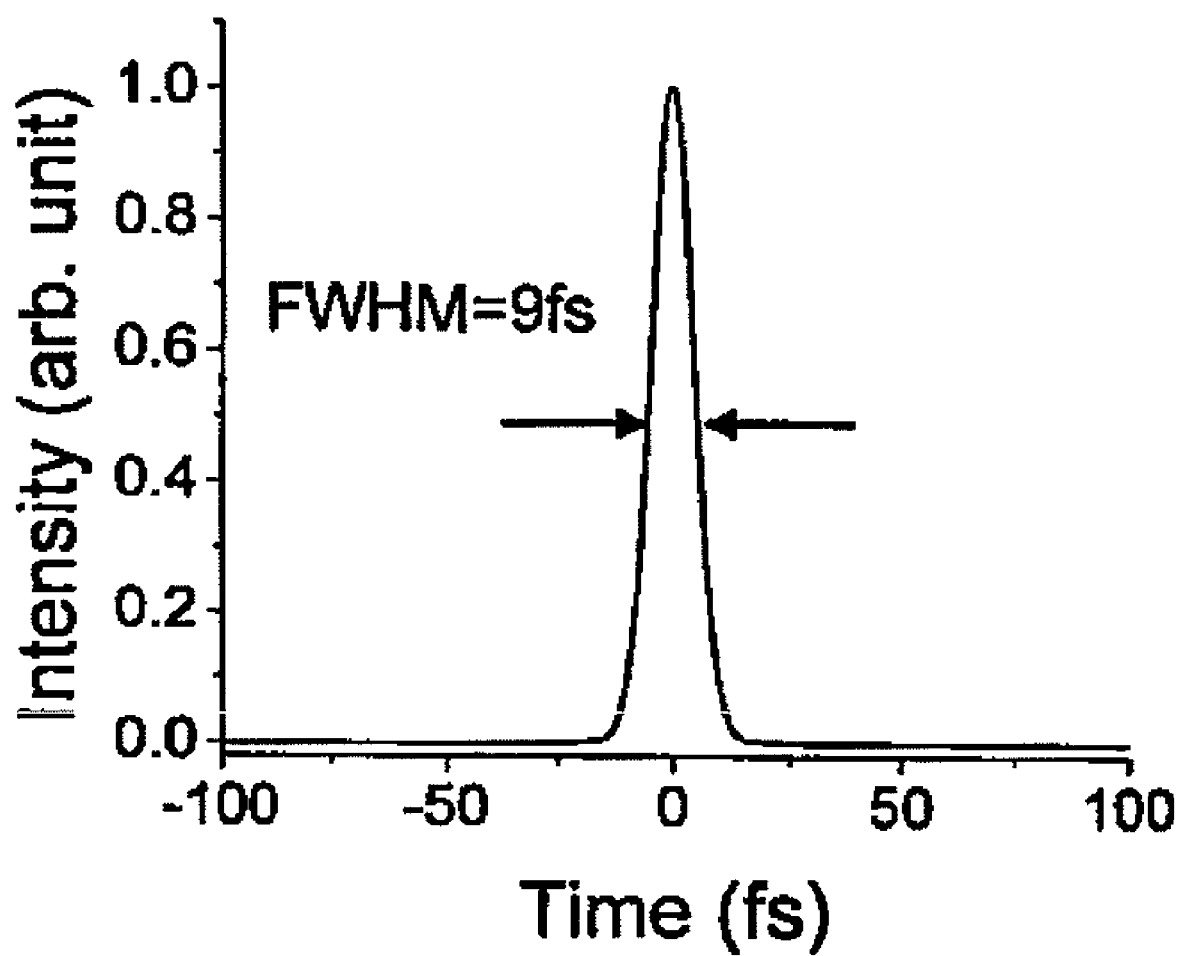
FIG. 7 shows a calculated transform-limited pulse duration supported by the normalized spectrum of FIG. 6.
Figure 8A:
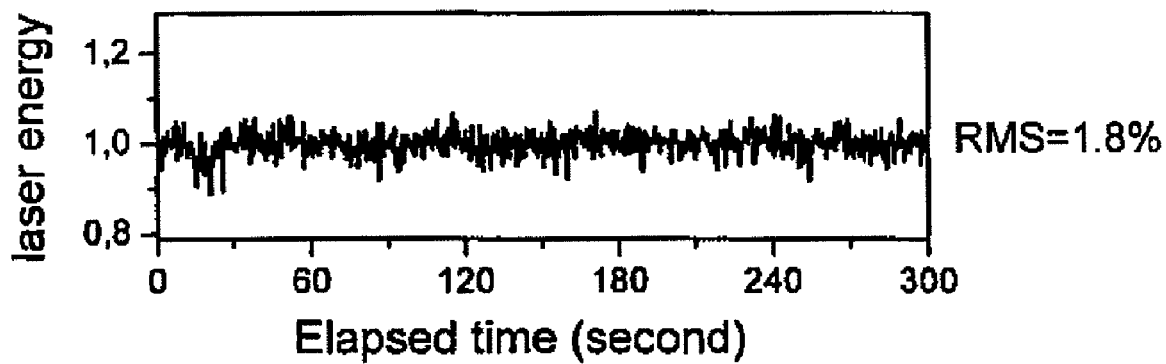
FIGS. 8A and 8B show the temporal evolution of energy per pulse normalized over the mean energy for the output pulses with filamentation of the primary beam (FIG. 8A) and without filamentation of the primary beam (FIG. 8B). The root mean square (RMS) energy fluctuations are indicated on the right-hand side.
Figure 8B:
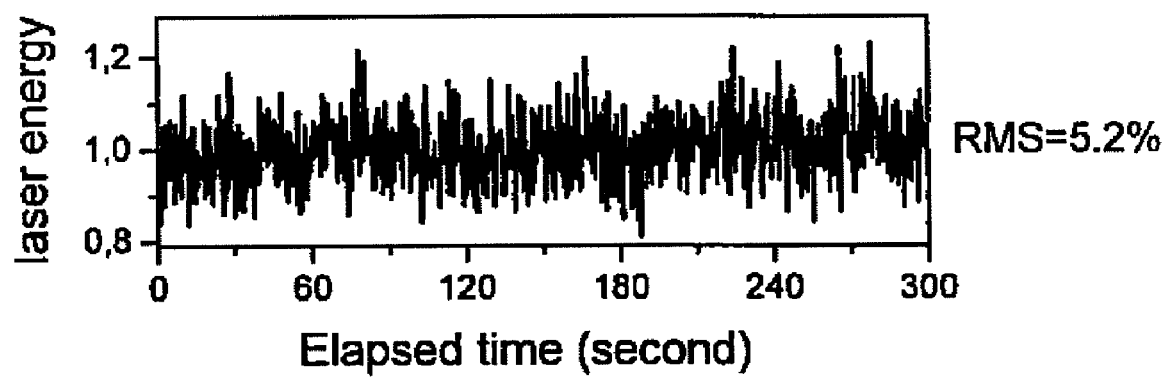
Figure 9:
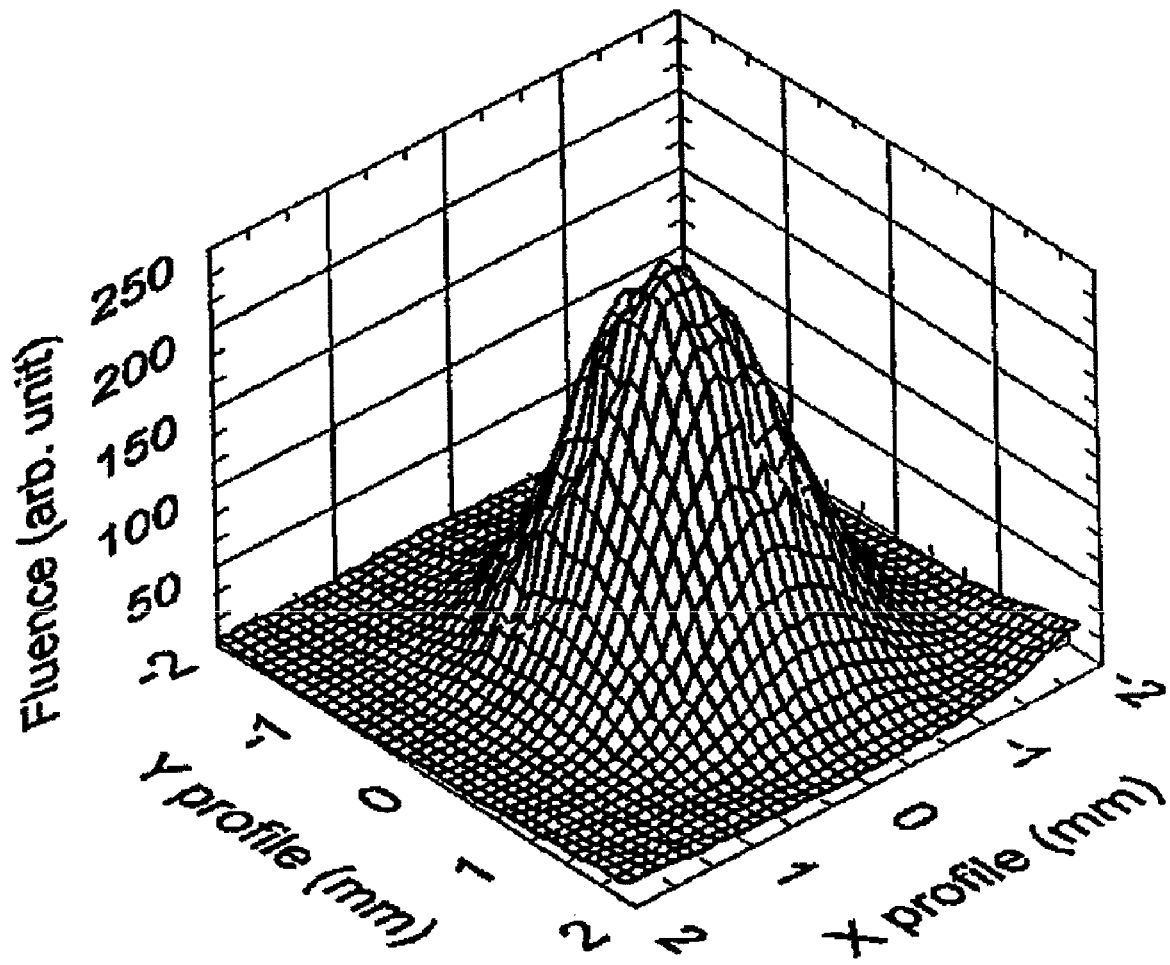
FIG. 9 shows a far-field fluence profile of the output pulses measured beyond the filament.

Through the four-waves mixing process inside the filament 22, the photon frequency of the tunable output pulse 34 corresponds to $2\omega_1-\omega_2$, where $\omega_1$ and $\omega_2$ are the frequency of the primary and secondary beams 26 and 32, respectively. Beyond the filament the output dichroic and/or polarizing optic 48 is used to separate the generated tunable visible output pulse 34 from the primary and secondary beams 26 and 32. For the range of infrared wavelength used from the OPA, the generated frequency of the tunable output pulse 34 was tuned in the visible spectrum as shown in FIG. 5. FIG. 6 shows an example of the tunable output pulse's spectrum centered around 581 nm. It is generated by superposing an input IR pulse centered at 1.32 µm inside the filament. The spectrum of the generated tunable output pulse is broad and the transform-limited pulse duration supported by the normalized spectrum after the filament by assuming a perfect bandpass and phase characteristic is shown in FIG. 7. The 9fs pulse duration at full width at half maximum shown in FIG. 7 corresponds to a few optical cycles light pulse centered at the wavelength of 581 nm. FIGS. 8A and 8B compare the temporal evolution of the measured laser pulse energies normalized to the mean energy for the tunable output pulses. The measured root mean square (RMS) energy fluctuation was 1.8% when the NIR pump power was above the critical power for self-focusing in air and one filament 22 was generated (FIG. 8A). For comparison, the measured RMS energy fluctuation increased to 5.2% when the pump powers of the input pulses were below the critical power for self-focusing in air and no filament was generated (FIG. 8B). The far-field fluence profile of the generated tunable light pulse is shown in FIG. 9 when one filament was generated by the NIR laser pulse. The fluence distribution was smooth, centered on the propagation axis and similar to a symmetric Gaussian profile. These latter stabilized energy and good beam profile are additional advantages of the current invention.

Figure 10:
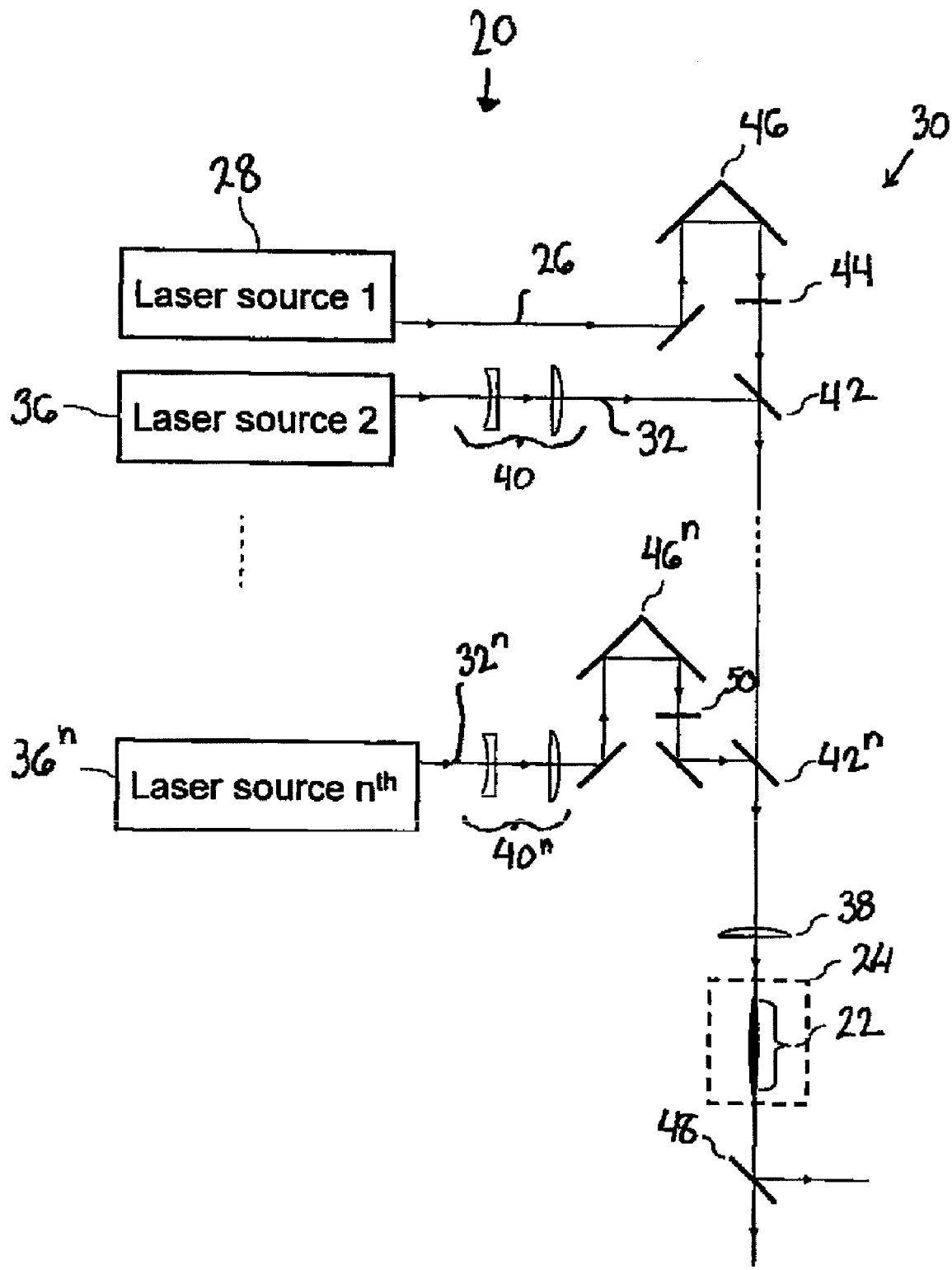
FIG. 10 is a schematic representation of a light source according to another preferred embodiment of the present invention.

With reference to FIG. 10, there is shown a device 20 according to an alternative embodiment of the invention where additional secondary beams of light pulses 32', ( . . . ), 32'', are also superposed to the filament 22 generated from the primary beam 26 in the interaction zone 24. Appropriate guiding optics are provided for guiding and focussing the additional secondary beams 32'' in the interaction zone, such as telescope 40'' and dichroic optical element 42''. The temporal delay between the primary beam 26 and the additional secondary beam 32'' from the $n^{th}$ source 36'' preferably controlled by an additional optical delay line 46''. The polarization of the additional secondary beam 32'' is preferably controlled by a polarizing optics 50 and its polarization was optimized to get the maximum output energy for the generated tunable output pulse. By way of example, any appropriate number of intermediate laser sources can be added between the secondary laser source 36 and the additional laser source 36'' in FIG. 10. The embodiment of these intermediate laser sources are alike the embodiment described for the additional laser source 36'' with the related dichroic optics, telescope, optical delay line and wave plate. In FIG. 10, the focusing optics 38 may be a lens, a concave or convex mirror, an axicon or a combination of these optics.

Figure 11:
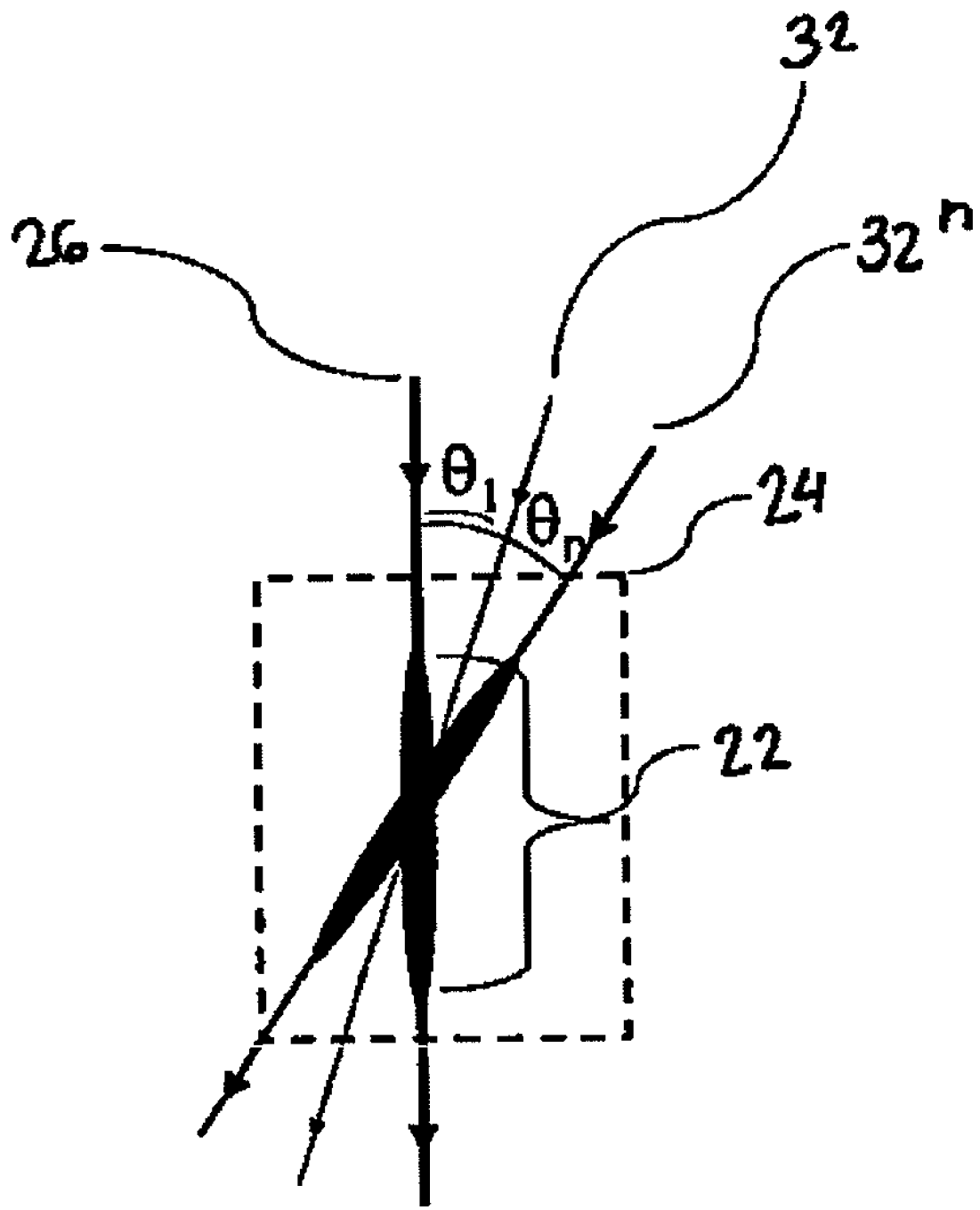
FIG. 11 is a schematic diagram of the superposition of the multiple beams inside the interaction zone at different angles En according to the preferred embodiment of FIG. 10.

FIG. 11 shows the angle $\theta_n$, between the input beams (the primary beam 26, secondary beam 32 and any number of additional secondary beams 32'') in the interaction zone 24. The input beams may generate a single or multiple filaments in the optical medium and the angle between the various secondary beams 32, 32'' and the primary beam 26 can vary from 0 degree to 180 degrees.

As will be appreciated by one skilled in the art, the present invention provides an efficient and simple approach to generate intense and ultrashort tunable laser output pulses spanning from the microwaves up to ultraviolet frequencies which can be applied to various field, for example in bio-medicine for non-linear photodynamic therapy and for tunable non-linear microscopy. Further, the present invention can be applied to laser control of chemical reaction, micromachining, wave-guide writing and dual-broadband absorption spectroscopy of pollutants using LIDAR (Light Detection And Ranging).

Of course, numerous modifications could be made to the embodiment described above without departing from the scope of the present invention as defined in the appended claims.

The invention claimed is:

1. A method for generating output light pulses having targeted optical characteristics, said optical characteristics including at least one of a central wavelength, a spectral profile, a spatial profile, a temporal shape, an energy and a stability of the output light pulses, the method comprising the steps of:
   a) inputting a primary beam of light pulses in an interaction zone, said primary beam having a peak power above a self-focusing threshold in said interaction zone, thereby forming a filament therein;
   b) superposing a secondary beam of light pulses on at least a portion of the filament, the secondary beam interacting with the primary beam to generate the output light pulses; and
   c) adjusting parameters of the primary and secondary beams to obtain the targeted optical characteristics of the output light pulses, said parameters including at least one of a polarization, an energy, a chirp, a spatial profile, a temporal shape and a central wavelength of each of the primary and secondary beams, a delay between said primary and secondary beams and an angle therebetween.

2. The method according to claim 1, wherein the interaction zone is an optical medium selected from the group consisting of a solid medium, a liquid medium, a gaseous medium and a combination thereof.

3. The method according to claim 1, wherein the superposing of step b) comprises inputting the secondary beam in the interaction zone at an angle θ with the primary beam.

4. The method according to claim 3, wherein the angle θ has a value between 0 and 180 degrees.

5. The method according to claim 1, wherein the secondary beam has a peak power above a self-focusing threshold in said interaction zone, thereby also forming a filament therein.

6. The method according to claim 1, comprising an additional step d) of separating the output light pulses from the primary and secondary beams.

7. The method according to claim 1, wherein the superposing of step b) further comprises superposing at least one additional secondary beam on at least a portion of the filament, each of the at least one additional secondary beam also interacting with the primary beam to generate the output light pulses, the adjusting of step c) comprising adjusting parameters of each of the at least one additional secondary beams.

8. An optical device for generating output light pulses having targeted optical characteristics, said optical characteristics including at least one of a central wavelength, a spectral profile, a spatial profile, a temporal shape, an intensity and a stability of the output light pulses, the optical device comprising:
   means for inputting a primary beam of light pulses in an interaction zone, said primary beam having a peak power above a self-focusing threshold in said interaction zone, thereby forming a filament therein;
   means for superposing a secondary beam of light pulses on at least a portion of the filament, the secondary beam interacting with the primary beam to generate the output light pulses; and
   means for adjusting parameters of the primary and secondary beams to obtain the targeted optical characteristics of the output light pulses, said parameters including at least one of a polarization, an energy, a chirp, a spatial profile, a temporal shape and a central wavelength of each of the primary and secondary beams, a delay between said primary and secondary beams and an angle therebetween.

9. The optical device according to claim 8, wherein the interaction zone is an optical medium selected from the group consisting of a solid medium, a liquid medium, a gaseous medium and a combination thereof.

10. The optical device according to claim 8, wherein the means for inputting a primary beam comprise a primary pulsed laser source for generating said primary beam and an optical guiding assembly for guiding the primary beam along a path from the primary pulsed light source to the interaction zone.

11. The optical device according to claim 10, wherein the primary pulsed laser source is a near-infrared femtosecond laser source.

12. The optical device according to claim 10, wherein the means for superposing a secondary beam comprise a secondary pulsed laser source for generating said secondary beam, the optical guiding assembly further guiding the secondary beam along a path from the secondary pulsed light source to the interaction zone.

13. The optical device according to claim 12, wherein the secondary pulsed laser source is an infrared femtosecond laser source.

14. The optical device according to claim 12, wherein the secondary beam has a peak power above a self-focusing threshold in said interaction zone, thereby also forming a filament therein.

15. The optical device according to claim 12, wherein the optical guiding assembly comprises focusing optics in the path of the primary and secondary beams.

16. The optical device according to claim 12, wherein the means for adjusting parameters of the primary and secondary beams comprise energy controls of the primary and secondary pulsed light sources for adjusting the energy of the primary and secondary beams, respectively.

17. The optical device according to claim 12, wherein the means for adjusting parameters of the primary and secondary beams comprise polarizing optics in the path of at least one of the primary and secondary beams for adjusting the polarization thereof.

18. The optical device according to claim 12, wherein at least one of said primary and secondary pulsed laser sources is spectrally tunable.

19. The optical device according to claim 12, wherein the means for adjusting parameters of the primary and secondary beams comprise an optical delay line in the path of at least one of the primary and secondary beams for adjusting the delay therebetween.

20. The optical device according to claim 12, wherein the means for adjusting parameters of the primary and secondary beams comprise a configuration of the guiding assembly designed to adjust the angle between said primary and secondary beams in the interaction zone.

21. The optical device according to claim 8, further comprising means for separating the output light pulses from the primary and secondary beams.

22. The optical device according to claim 21, wherein the means for separating the output light pulses from the primary and secondary beams comprise at least one of dichroic and polarization discriminating optics downstream said interaction zone.

23. The optical device according to claim 8, further comprising:
   means for superposing at least one additional secondary beam on at least a portion of the filament, each of the at least one additional secondary beam also interacting with the primary beam to generate the light pulses; and
   means for adjusting parameters of each of the at least one additional secondary beams.

24. A light source generating output light pulses, the light source comprising:
   a primary pulsed laser source generating a primary beam of light pulses;
   a secondary pulsed laser source generating a secondary beam of light pulses; and
   an optical guiding assembly guiding the primary and secondary beams to an interaction zone;
wherein the primary beam has a peak power above a self-focusing threshold in the interaction zone, thereby forming a filament therein, and the secondary beam is superposed on at least a portion of the filament and interacts with the primary beam to generate the output light pulses.

25. The light source according to claim 24, wherein at least one of the primary and secondary beams is spectrally tunable.

26. The light source according to claim 24, wherein at least one of the primary and secondary light sources comprises energy controls for controlling an energy of the corresponding one of the primary and secondary beams.

27. The light source according to claim 24, wherein the primary pulsed laser source is a near-infrared femtosecond laser source.

28. The light source according to claim 24, wherein the secondary pulsed laser source is an infrared femtosecond laser source.

29. The light source according to claim 24, wherein the secondary beam has a peak power above a self-focusing threshold in said interaction zone, thereby also forming a filament therein.

30. The light source according to claim 24, wherein the optical guiding assembly comprise focusing optics in the path of the primary and secondary beams.

31. The light source according to claim 24, wherein the optical guiding assembly comprise at least one of dichroic and polarization discriminating optics positioned to combine the primary and secondary beams.

32. The light source according to claim 24, further comprising polarizing optics in a path of at least one of the primary and secondary beams for adjusting a polarization thereof.

33. The light source according to claim 24, further comprising an optical delay line in a path of at least one of the primary and secondary beams for adjusting a delay therebetween.

34. The light source according to claim 24 wherein:
at least one of the primary and secondary beams is spectrally tunable; and
at least one of the primary and secondary light sources comprises energy controls for controlling an energy of the corresponding one of the primary and secondary beams;
said light source further comprising:
polarizing optics in a path of at least one of the primary and secondary beams for adjusting a polarization thereof; and
an optical delay line in the path of at least one of the primary and secondary beams for adjusting a delay therebetween.

35. The light source according to claim 24, further comprising at least one of dichroic and polarization discriminating optics downstream said interaction zone for separating the output light pulses from the primary and secondary beams.

36. The light source according to claim 24, further comprising at least one additional secondary pulsed laser source each generating an additional secondary beam of light pulses having a controllable intensity, and wherein the optical guiding assembly guides each additional secondary beam to the interaction zone, each of the at least one additional secondary beam being superposed on at least a portion of the filament and interacting with the primary beam to generate the output light pulses.

* * * * *